United States Patent
Yun

(10) Patent No.: US 10,673,567 B2
(45) Date of Patent: Jun. 2, 2020

(54) TRANSMISSION PROCESSING METHOD AND DEVICE

(71) Applicant: BAICELLS TECHNOLOGIES CO. LTD., Beijing (CN)

(72) Inventor: Xiang Yun, Beijing (CN)

(73) Assignee: BAICELLS TECHNOLOGIES CO. LTD., Beijing (CN)

( * ) Notice: Subject to any disclaimer, the term of this patent is extended or adjusted under 35 U.S.C. 154(b) by 89 days.

(21) Appl. No.: 16/054,312

(22) Filed: Aug. 3, 2018

(65) Prior Publication Data
US 2018/0343084 A1 Nov. 29, 2018

Related U.S. Application Data

(63) Continuation of application No. PCT/CN2017/071375, filed on Jan. 17, 2017.

(30) Foreign Application Priority Data

Feb. 5, 2016 (CN) .......................... 2016 1 0082984

(51) Int. Cl.
*H04L 1/00* (2006.01)
*H04W 72/12* (2009.01)
(Continued)

(52) U.S. Cl.
CPC ......... *H04L 1/0068* (2013.01); *H04B 17/318* (2015.01); *H04L 1/0061* (2013.01);
(Continued)

(58) Field of Classification Search
CPC ... H04B 17/318; H04L 1/0061; H04L 1/0068; H04W 16/14; H04W 24/10; H04W 72/12;
(Continued)

(56) References Cited

U.S. PATENT DOCUMENTS

| | | | | |
|---|---|---|---|---|
| 2011/0013543 A1* | 1/2011 | Lim | ..................... | H04W 72/042 370/281 |
| 2014/0341018 A1 | 11/2014 | Bhushan et al. | | |
| 2017/0027013 A1* | 1/2017 | Kim | ..................... | H04W 72/04 |

FOREIGN PATENT DOCUMENTS

| | | |
|---|---|---|
| CN | 102421193 A | 4/2012 |
| CN | 102804639 A | 11/2012 |
| CN | 105493592 A | 4/2016 |
| CN | 105657852 A | 6/2016 |
| JP | 2012531081 A | 12/2012 |
| JP | 5452716 B2 | 3/2014 |
| WO | WO-2014189912 A1 | 11/2014 |

OTHER PUBLICATIONS

International Search Report for International Application No. PCT/CN2017/071375, dated Apr. 12, 2017.
(Continued)

*Primary Examiner* — Abdelillah Elmejjarmi
(74) *Attorney, Agent, or Firm* — Marshall, Gerstein & Borun LLP

(57) ABSTRACT

The present disclosure discloses a transmission processing method and device. The transmission processing method includes: performing uplink scheduling for a User Equipment (UE) in accordance with an uplink scheduling criterion, and determining whether to apply puncturing in accordance with an uplink scheduling result and/or determining whether to instruct the UE to apply the puncturing via signaling in accordance with the uplink scheduling performed for the UE. The uplink scheduling criterion is preset and is for limiting the uplink scheduled UE to reduce a number of puncturing operations. In the prior art, an uplink scheduled UE that is transmitting data needs to be instructed to apply puncturing in a fixed position of a subframe whenever a new uplink scheduled UE appears in a wireless communication system, resulting in a technical problem of a low transmission rate, which is solved in the present disclosure.

14 Claims, 3 Drawing Sheets

(51) Int. Cl.
  *H04B 17/318*  (2015.01)
  *H04W 24/10*  (2009.01)
  *H04W 74/08*  (2009.01)
  *H04W 16/14*  (2009.01)

(52) U.S. Cl.
  CPC ........... *H04W 24/10* (2013.01); *H04W 72/12* (2013.01); *H04W 72/1268* (2013.01); *H04W 74/0808* (2013.01); *H04W 16/14* (2013.01)

(58) Field of Classification Search
  CPC ......... H04W 72/1268; H04W 72/1289; H04W 74/0808
  See application file for complete search history.

(56) References Cited

OTHER PUBLICATIONS

Ahmed, K.S., et al., "Extending LTE to Unlicensed Band-Merit and Coexistence", IEEE ICC 2015-Workshop on LTE in Unlicensed Bands: Potentials and Challenges, Dec. 31, 2015, pp. 2344-2349.
Office Action for Japanese Patent Application No. 2018-540479, dated Jun. 11, 2019.
Supplementary European Search Report for application No. PCT/CN2017071375, dated Jun. 28, 2019.
LG Electronics, "Coordination for DL control channel in co-channel CSG deployment", XP050420379, May 7, 2010.

* cited by examiner

TRANSMISSION PROCESSING METHOD AND DEVICE

CROSS-REFERENCE TO RELATED APPLICATIONS

The present application is based on International Application No. PCT/CN2017/071375 filed on Jan. 17, 2017, which claims priority to Chinese Patent Application No. 201610082984.1, filed on Feb. 5, 2016, the contents of which are incorporated herein by reference in its entirety.

TECHNICAL FIELD

The present disclosure relates to the field of wireless communication and in particular to a transmission processing method and device.

BACKGROUND

A mobile communication system means a system by which an operator provides communication services for a user terminal (e.g., a mobile phone) by deploying a wireless access network device (e.g., a base station), a core network device (e.g., a Home Location Register, HLR), etc. It is mainly applied to a licensed frequency band for the operator to obtain a license through auction, distribution or the like and to use a specific spectrum resource for network deployment. Mobile communication has experienced the first, second, third and fourth generations. The first generation of mobile communication means an original analog voice-only cellular phone standard, mainly using the analog technology and the Frequency Division Multiple Access (FDMA) method. The second generation of mobile communication introduces the digital technology to improve the network capacity, the voice quality and confidentiality, represented by Global System for Mobile Communication (GSM) and Code Division Multiple Access (CDMA IS-95). The third generation of mobile communication mainly means three technologies of CDMA2000, WCDMA and TD-SCDMA, all of which are based on the code division multiple access. The fourth generation of mobile communication has relatively internationally unified standards, is Long Term Evolution/Long Term Evolution-Advanced (LTE/LTE-A) established by 3GPP (the 3rd Generation Partnership Project) of International Organization for Standardization, has a downlink based on Orthogonal Frequency Division Multiple Access (OFDMA) and an uplink based on Single Carrier-Frequency Division Multiple Access (SC-FDMA), and achieves high-speed transmission with a downlink peak value of 1 Gbps and an uplink peak value of 500 Mbps based on a flexible bandwidth and a self-adaptive modulation and coding mode.

However, wireless communication, for example, WiFi, on an unlicensed frequency band is a general term for the 802.11-series technologies developed by the Institute of Electrical and Electronics Engineers IEEE, for example, 802.11a/g/n/ac. WiFi is mainly applied to local wireless communication, generally has a relatively smaller coverage, and is a simple and relatively cheaper wireless communication means. WiFi of the original version works at 2.4 GHz, but a relatively smaller available bandwidth in the 2.4 GHz frequency band and more wireless transmitting devices working in the 2.4 GHz frequency band result in a decline of performance of WiFi working at 2.4 GHz. A new communication frequency of 5 GHz (note: 5 GHz described herein does not mean a single frequency point but various frequency bands around 5 GHz and can be understood as frequency bands from 5.1 GHz to 5.9 GHz) has been explored for WiFi of later versions. In order to solve a contradiction between the increasing demand for data traffic and the increasingly scarce radio frequency, recently, 3GPP has begun their studies on application of an LTE system to the unlicensed frequency band, aiming to increase the available bandwidth for the LTE system. The Licensed Assisted Access (LAA) currently discussed in 3GPP mainly aggregates licensed and unlicensed frequency bands by Carrier Aggregation (CA), and extends the LTE system to the unlicensed frequency band for transmission. In Rel.13 standards, using the unlicensed frequency band for downlink transmission and introducing the Listen Before Talk (LBT) mechanism have been standardized.

In the Rel. 14 version of 3GPP, the unlicensed frequency band is used for uplink transmission, and an uplink LBT method is being studied. Meanwhile, the MulteFireAlliance, which introduces LTE into the unlicensed frequency band in standalone mode, is also studying the uplink LBT method.

In an uplink transmission process, a User Equipment (UE) needs to perform LBT before uplink transmission. Uplink transmission cannot be performed until successful LBT. However, if an uplink scheduled UE (i.e., UE1 in FIG. 1) of the $n^{th}$ subframe is transmitting data when an uplink scheduled UE (i.e., UE2 in FIG. 1) of the $(n+1)^{th}$ subframe performs LBT before transmitting data, the uplink scheduled UE of the $(n+1)^{th}$ subframe may be interfered. Thus, LBT of the uplink scheduled UE of the $(n+1)^{th}$ subframe fails, and the data cannot be transmitted. For details, refer to FIG. 1.

In order to avoid the phenomenon that the LBT of the uplink scheduled UE of the $(n+1)^{th}$ subframe fails because the uplink scheduled UE of the $(n+1)^{th}$ subframe is interfered by the uplink scheduled UE that transmits data on the $n^{th}$ subframe and the $(n+1)^{th}$ subframe. The following two solutions are mainly provided in the prior art.

The first solution: referring to FIG. 2, the uplink scheduled UE (i.e., UE1 in the figure) that transmits data on the $n^{th}$ subframe and the $(n+1)^{th}$ subframe applies puncturing in data of a time period of one or more symbols at a beginning portion of the $(n+1)^{th}$ subframe; a new uplink scheduled UE (i.e., UE2 in the figure) of the $(n+1)^{th}$ subframe uses this time period to perform LBT; and after the new uplink scheduled UE of the $(n+1)^{th}$ subframe successfully performs LBT, data transmission is performed. A vertical line in FIG. 2 is a subframe boundary of the $n^{th}$ subframe and the $(n+1)^{th}$ subframe.

The second solution: referring to FIG. 3, an uplink scheduled UE (i.e., UE1 in the figure) that transmits data on the $n^{th}$ subframe and the $(n+1)^{th}$ subframe applies puncturing on data of a time period of one or more symbols at an ending portion of the $n^{th}$ subframe; a new uplink scheduled UE (i.e., UE2 in the figure) of the $(n+1)^{th}$ subframe uses this time period to perform LBT; and after the new uplink scheduled UE of the $(n+1)^{th}$ subframe successfully performs LBT, data transmission is performed.

However, in the existing solutions (i.e., the first solution and the second solution described above), a UE that performs transmission (i.e., the uplink scheduled UE that transmits data in the $n^{th}$ subframe and the $(n+1)^{th}$ subframe) will pause data transmission. Consequently, the system overhead is increased and the uplink transmission data rate is reduced. Besides, as the UE needs to pause data transmission, other systems may take up a channel, resulting in LBT failures and reducing the channel occupancy probability.

Currently, no effective solution has been proposed to solve the above problem.

SUMMARY

The embodiments of the present disclosure provide a transmission processing method and device to at least solve the technical problem of a low transmission data rate caused by the reason that in the prior art, an uplink scheduled UE that is transmitting data needs to be instructed to apply puncturing in a fixed position of a subframe whenever a new uplink scheduled UE appears in a wireless communication system.

According to an aspect of the embodiments of the present disclosure, there is provided a transmission processing method, including: performing uplink scheduling for a UE in accordance with an uplink scheduling criterion, and determining whether to apply puncturing in accordance with an uplink scheduling result and/or determining whether to instruct the UE to apply the puncturing via signaling in accordance with the uplink scheduling performed for the UE, wherein the uplink scheduling criterion is preset and is for limiting the uplink scheduled UE to reduce a number of puncturing operations.

Further, the uplink scheduling criterion includes at least one of the followings. In a transmitted burst, a set of uplink scheduled UEs in the $(n+1)^{th}$ subframe is a subset of a set of uplink scheduled UEs in the $n^{th}$ subframe. When the uplink scheduled UEs in the $(n+1)^{th}$ subframe are different from the uplink scheduled UEs in the $n^{th}$ subframe, only those UEs that will not be interfered by a reference UE are scheduled. The reference UE is an uplink scheduled UE that performs transmission in both the $n^{th}$ subframe and the $(n+1)^{th}$ subframe when the puncturing is applied in a beginning portion of the $(n+1)^{th}$ subframe. The reference UE is the uplink scheduled UE that performs transmission in the $n^{th}$ subframe.

Further, the UEs that will not be interfered by the reference UE are determined in accordance with respective locations of the UEs or respective reports reported by the UEs.

Further, said determining the UEs that will not be interfered by the reference UE in accordance with the respective locations of the UEs includes: calculating a relative distance between a target UE and the reference UE; and determining that the target UE is a UE that will not be interfered by the reference UE when the relative distance is larger than a distance threshold.

Further, said determining the UEs that will not be interfered by the reference UE in accordance with the respective reports reported by the UEs includes: acquiring RSSI information of a target UE when the reference UE performs transmission; and determining the target UE as a UE that will not be interfered by the reference UE when a received signal strength indicated by the RSSI information is lower than an LBT threshold value.

Further, the target UE is an uplink scheduled UE that is newly added to the $(n+1)^{th}$ subframe.

Further, said determining whether to instruct the UE to apply the puncturing via signaling in accordance with the uplink scheduling performed for the UE includes: comparing the uplink scheduled UEs in the $(n+1)^{th}$ subframe with the uplink scheduled UEs in the $n^{th}$ subframe to obtain the uplink scheduling result, and instructing whether to apply puncturing in accordance with the uplink scheduling result.

Further, said determining whether to instruct the UE to apply the puncturing via signaling in accordance with the uplink scheduling performed for the UE includes: comparing the uplink scheduled UEs in the $(n+1)^{th}$ subframe with the uplink scheduled UEs in the $n^{th}$ subframe to obtain the uplink scheduling result; if the uplink scheduling result meets the uplink scheduling criterion, determining to instruct the reference UE not to apply the puncturing via the signaling, wherein the uplink scheduling criterion is preset and is for limiting the uplink scheduled UE to reduce a number of puncturing operations, the reference UE is the uplink scheduled UE that performs transmission in both the $n^{th}$ subframe and the $(n+1)^{th}$ subframe when the puncturing is applied in a beginning portion of the $(n+1)^{th}$ subframe, and the reference UE is an uplink scheduled UE that performs transmission in the $n^{th}$ subframe when the puncturing is applied in an ending portion of the $n^{th}$ subframe; and if the uplink scheduling result does not meet the uplink scheduling criterion, determining to instruct the reference UE to apply the puncturing via signaling.

Further, the uplink scheduling criterion includes a first uplink scheduling criterion and a second uplink scheduling criterion. If the uplink scheduling result meets the uplink scheduling criterion, said determining to instruct the reference UE not to apply puncturing via signaling includes: if the uplink scheduling result meets the first uplink scheduling criterion or the second uplink scheduling criterion, determining to instruct the reference UE not to apply puncturing via signaling. The first uplink scheduling criterion being that in a transmitted burst, a set of uplink scheduled UEs in the $(n+1)^{th}$ subframe is a subset of a set of uplink scheduled UEs in the $n^{th}$ subframe. The second uplink scheduling criterion being that when the uplink scheduled UEs in the $(n+1)^{th}$ subframe are different from the uplink scheduled UEs in the $n^{th}$ subframe, only those UEs that will not be interfered by the reference UE is scheduled. If the uplink scheduling result does not meet the uplink scheduling criterion, said determining to instruct the reference UE to apply puncturing via signaling includes: if the uplink scheduling result meets none of the first uplink scheduling criterion and the second uplink scheduling criterion, determining to instruct the reference UE to apply puncturing via signaling.

Further, said determining whether to instruct the UE to apply the puncturing via signaling in accordance with the uplink scheduling performed for the UE includes: defining a first control signaling to indicate puncturing information of all UEs in a target cell subsequent to the $x^{th}$ subframe, wherein the target cell is a cell covered by a base station; and adding a bit in the first control signaling for indicating the puncturing information.

Further, said adding the bit in the first control signaling for indicating the puncturing information includes: when the value of the bit is a first result, instructing the UE not to apply puncturing; and when the value of the bit is a second result, instructing the UE to apply puncturing. The first result and the second result are different from each other.

Further, said determining whether to instruct the UE to apply the puncturing via signaling in accordance with the uplink scheduling performed for the UE includes: defining a first control signaling to indicate puncturing information of all UEs in a target cell subsequent to the $x^{th}$ subframe, wherein the target cell is a cell covered by a base station; and setting a target message bit in the first control signaling for indicating the puncturing information.

Further, said setting the target message bit in the first control signaling for indicating the puncturing information includes: when the target message bit exists in a specific format, instructing the UE to apply puncturing; and when the target message bit exists not in a specific format, instructing the UE not to apply puncturing.

Further, said setting the target message bit in the first control signaling for indicating the puncturing information includes any of the followings: reserving a number of at least one control channel element CCE, instructing the UE to apply puncturing when the CCE is the reserved number, and instructing the UE not to apply puncturing when the CCE is not the reserved number; if a preset cyclic redundancy check CRC is adopted, instructing the UE to apply puncturing, and if the preset CRC is not adopted, instructing the UE not to apply puncturing; and if a CRC is not adopted, instructing the UE to apply puncturing, and if the CRC is adopted, instructing the UE not to apply puncturing.

Further, said determining whether to instruct the UE to apply the puncturing via signaling in accordance with the uplink scheduling performed for the UE includes: defining a first control signaling to indicate puncturing information of all UEs in a target cell subsequent to the $x^{th}$ subframe, wherein the target cell is a cell covered by a base station; and combining the puncturing information in the first control signaling with a target bit message for encoding to indicate the puncturing information.

Further, said combining the puncturing information in the first control signaling with the target bit message for encoding to indicate the puncturing information includes: performing joint encoding on the puncturing information in the first control signaling and a current bit message that indicates a subframe length, and simultaneously indicating the subframe length and the puncturing information.

Further, said determining whether to instruct the UE to apply the puncturing via signaling in accordance with the uplink scheduling performed for the UE includes: comparing the uplink scheduled UEs in the $(n+1)^{th}$ subframe with the uplink scheduled UEs in the $n^{th}$ subframe, and analyzing an interfering UE of an uplink scheduled UE that is newly added to the $(n+1)^{th}$ subframe. It is determined to instruct the interfering UE to apply puncturing via the signaling if the interfering UE is the uplink scheduled UE that performs transmission in both the $n^{th}$ subframe and the $(n+1)^{th}$ subframe. Otherwise, it is determined to instruct the interfering UE not to apply puncturing via the signaling.

Further, said determining whether to instruct the UE to apply the puncturing via signaling in accordance with the uplink scheduling performed for the UE includes: defining a second control signaling to indicate a puncturing information of a certain UE subsequent to the $x^{th}$ subframe; and adding a bit into the second control signaling to indicate the puncturing information.

Further, said adding the bit into the second control signaling to indicate the puncturing information includes: when the value of the bit is a first result, instructing the UE not to apply puncturing; and when the value of the bit is a second result, instructing the UE to apply puncturing. The first result is different from the second result.

Further, said determining whether to instruct the UE to apply the puncturing via signaling in accordance with the uplink scheduling performed for the UE includes: defining a second control signaling to indicate a puncturing information of a certain UE subsequent to the $x^{th}$ subframe; and setting a target message bit in the second control signaling for indicating the puncturing information.

Further, said setting the target message bit in the second control signaling for indicating the puncturing information includes: when the target message bit exists in a specific format, instructing the UE to apply puncturing; and when the target message bit exists not in a specific format, instructing the UE not to apply puncturing.

Further, said setting the target message bit in the second control signaling for indicating the puncturing information includes at least one of the followings: reserving a number of at least one control channel element CCE, instructing the UE to apply puncturing when the CCE is the reserved number, and instructing the UE not to apply puncturing when the CCE is not the reserved number; if a preset cyclic redundancy check CRC is adopted, instructing the UE to apply puncturing, and if the preset cyclic redundancy check CRC is not adopted, instructing the UE not to apply puncturing; and if a CRC is not adopted, instructing the UE to apply puncturing, and if the CRC is adopted, instructing the UE not to apply puncturing.

Further, said determining whether to instruct the UE to apply the puncturing via signaling in accordance with the uplink scheduling performed for the UE includes: defining a second control signaling to indicate a puncturing information of a certain UE subsequent to the $x^{th}$ subframe; and combining the puncturing information in the second control signaling with a target bit message for encoding to indicate the puncturing information.

Further, said combining the puncturing information in the second control signaling with the target bit message for encoding to indicate the puncturing information includes: performing joint encoding on the puncturing information in the second control signaling and a current bit message that indicates a subframe length, and simultaneously indicating the subframe length and the puncturing information.

Further, said determining whether to instruct the UE to apply the puncturing via signaling in accordance with the uplink scheduling performed for the UE includes: comparing the uplink scheduled UEs in the $(n+1)^{th}$ subframe with the uplink scheduled UEs in the $n^{th}$ subframe, and analyzing an interference source UE of an uplink scheduled UE that is newly added to the $(n+1)^{th}$ subframe. If the interfering UE is the uplink scheduled UE that performs transmission in both the $n^{th}$ subframe and the $(n+1)^{th}$ subframe, the interfering UE is grouped as an interfering UE group and a non-interfering UE is grouped as a non-interfering UE group. It is determined to instruct all uplink scheduled UEs in the interfering UE group to apply puncturing via the signaling and all uplink scheduled UEs in the non-interfering UE group not to apply puncturing via the signaling.

Further, said determining whether to instruct the UE to apply the puncturing via signaling in accordance with the uplink scheduling performed for the UE includes: defining a third control signaling to indicate puncturing information of a group of UEs subsequent to the $x^{th}$ subframe; and adding a bit into the third control signaling for indicating the puncturing information.

Further, said adding the bit into the third control signaling for indicating the puncturing information includes: when the value of the bit is a first result, instructing the UE not to apply puncturing; and when the value of the bit is a second result, instructing the UE to apply puncturing. The first result is different from the second result.

Further, said determining whether to instruct the UE to apply the puncturing via signaling in accordance with the uplink scheduling performed for the UE includes: defining a third control signaling to indicate puncturing information of a group of UEs subsequent to the $x^{th}$ subframe; and setting a target message bit in the third control signaling for indicating the puncturing information.

Further, said setting the target message bit in the third control signaling for indicating the puncturing information includes: when the target message bit exists in a specific format, instructing the UE to apply puncturing; and when the target message bit exists not in a specific format, instructing the UE not to apply puncturing.

Further, said setting the target message bit in the third control signaling for indicating the puncturing information includes at least one of the followings: reserving a number of at least one control channel element CCE, instructing the UE to apply puncturing when the CCE is the reserved number, and instructing the UE not to apply puncturing when the CCE is not the reserved number; if a preset cyclic redundancy check CRC is adopted, instructing the UE to apply puncturing, and if the preset cyclic redundancy check CRC is not adopted, instructing the UE not to apply puncturing; and if a CRC is not adopted, instructing the UE to apply puncturing, and if the CRC is adopted, instructing the UE not to apply puncturing.

Further, said determining whether to instruct the UE to apply the puncturing via signaling in accordance with the uplink scheduling performed for the UE includes: defining a third control signaling to indicate puncturing information of a group of UEs subsequent to the $x^{th}$ subframe; and combining the puncturing information in the third control signaling with a target bit message for encoding to indicate the puncturing information.

Further, said combining the puncturing information in the third control signaling with the target bit message for encoding to indicate the puncturing information includes: performing joint encoding on the puncturing information in the third control signaling and a current bit message that indicates a subframe length, and simultaneously indicating the subframe length and the puncturing information.

Further, said determining whether to instruct the UE to apply the puncturing via signaling in accordance with the uplink scheduling performed for the UE includes any of the followings: instructing the UE not to apply puncturing via the signaling if frame configuration of a wireless communication system by default is frame configuration for puncturing; instructing the UE to apply puncturing via the signaling if the frame configuration of the wireless communication system by default is frame configuration not for puncturing; and instructing the UE to apply or not to apply puncturing via the signaling if the wireless communication system has two frame configuration formats by default.

According to another aspect of the embodiment of the present disclosure, there is further provided a transmission processing device. The transmission processing device includes a processing unit configured to determine whether to apply puncturing by adjusting an uplink scheduling result and/or to determine to whether to instruct a UE to apply puncturing via signaling.

Further, an uplink scheduling criterion includes at least one of the followings. In a transmitted burst, a set of uplink scheduled UEs in the $(n+1)^{th}$ subframe is a subset of a set of uplink scheduled UEs in the $n^{th}$ subframe. When the uplink scheduled UEs in the $(n+1)^{th}$ subframe are different from the uplink scheduled UEs in the $n^{th}$ subframe, only a UE that will not be interfered by a reference UE is scheduled. The reference UE is the uplink scheduled UE that performs transmission in both the $n^{th}$ subframe and the $(n+1)^{th}$ subframe when puncturing is applied in a beginning portion of the $(n+1)^{th}$ subframe. The reference UE is the uplink scheduled UE that performs transmission in the $n^{th}$ subframe when puncturing is applied in an ending portion of the $n^{th}$ subframe.

Further, the processing unit includes a comparison module, a first determination module and a second determination module. The comparison module is configured to compare the uplink scheduled UEs in the $(n+1)^{th}$ subframe with the uplink scheduled UEs in the $n^{th}$ subframe to obtain the uplink scheduling result. The first determination module is configured to determine to instruct the reference UE not to apply puncturing via the signaling if the uplink scheduling result meets the uplink scheduling criterion. The uplink scheduling criterion is preset and is for limiting the uplink scheduled UE to reduce a number of puncturing operations. The reference UE is the uplink scheduled UE that performs transmission in both the $n^{th}$ subframe and the $(n+1)^{th}$ subframe when puncturing is applied in the beginning portion of the $(n+1)^{th}$ subframe. The reference UE is the uplink scheduled UE that performs transmission in the $n^{th}$ subframe when puncturing is applied in the ending portion of the $n^{th}$ subframe. The second determination module is configured to determine to instruct the reference UE to apply puncturing via the signaling if the uplink scheduling result does not meet the uplink scheduling criterion.

Further, the processing unit includes a first processing module. The first processing module is configured to compare the uplink scheduled UEs in the $(n+1)^{th}$ subframe with the uplink scheduled UEs in the $n^{th}$ subframe and to analyze an interference source UE of an uplink scheduled UE that is newly added to the $(n+1)^{th}$ subframe. It is determined to instruct the interfering UE to apply puncturing via signaling if the interfering UE is the uplink scheduled UE that performs transmission in both the $n^{th}$ subframe and the $(n+1)^{th}$ subframe. Otherwise, it is determined to instruct the interfering UE not to apply puncturing via signaling.

Further, the processing unit includes a second processing module. The second processing module is configured to compare the uplink scheduled UE of the $(n+1)^{th}$ subframe with the uplink scheduled UE of the $n^{th}$ subframe and to analyze an interfering UE of an uplink scheduled UE that is newly added to the $(n+1)^{th}$ subframe. If the interfering UE is the uplink scheduled UE that performs transmission in both the $n^{th}$ subframe and the $(n+1)^{th}$ subframe, the interfering UE is grouped as an interfering UE group and a non-interfering UE is grouped as a non-interfering UE group. It is determined to instruct all uplink scheduled UEs in the interfering UE group to apply puncturing via the signaling and all uplink scheduled UEs in the non-interfering UE group not to apply puncturing via the signaling.

Further, the processing unit includes any of a first instruction module, a second instruction module and a third instruction module. The first instruction module is configured to instruct the UE not to apply puncturing via signaling if frame configuration of a wireless communication system by default is frame configuration for puncturing. The second instruction module is configured to instruct the UE to apply puncturing via signaling if the frame configuration of the wireless communication system by default is frame configuration not for puncturing. The third instruction module is configured to instruct the UE to apply or not to apply puncturing via signaling if the wireless communication system has two frame configuration formats by default.

An embodiment of the present disclosure further provides a non-transitory computer readable storage medium. The non-transitory computer readable storage medium stores computer instructions configured to cause a computer to perform the foregoing transmission processing method of the present disclosure.

An embodiment of the present disclosure further provides a computer program product. The computer program product includes a computer program that is stored on a non-transitory computer readable storage medium. The computer program includes program instructions which, when executed by a computer, cause the computer to perform the forgoing transmission processing method of the present disclosure.

An embodiment of the present disclosure further provides an electronic device. The electronic device includes at least one processor and a memory communicatively connected with the at least one processor r. The memory stores instructions executable by the at least one processor and configured to perform the forgoing transmission processing method of the present disclosure.

In the embodiments of the present disclosure, the uplink scheduling is performed on the UE in accordance with the uplink scheduling criterion. Whether to apply puncturing is determined in accordance with the uplink scheduling result, and/or it is determined to whether to instruct the UE to apply puncturing via the signaling in accordance with the uplink scheduling performed on the UE. The uplink scheduling criterion is preset and is for limiting the uplink scheduled UE to reduce a number of puncturing operations. Whether the uplink scheduled UE applies puncturing or not is limited in accordance with the preset uplink scheduling criterion, or whether the UE is instructed to apply puncturing or not via the signaling is limited in accordance with the uplink scheduling performed on the UE, such that it is not necessary to instruct an uplink scheduled UE that is transmitting data to apply puncturing whenever a new uplink scheduled UE appears. Compared with the fact in the prior art that an uplink scheduled UE that is transmitting data needs to be instructed to apply puncturing in a fixed position of a subframe whenever a new uplink scheduled UE appears, the present disclosure achieves the objective of flexibly controlling the number of puncturing operations. Not only is the data transmission rate of the new uplink scheduled UE improved, but also the number of puncturing operations is reduced as much as possible. Thus, the technical effect of improving the data transmission rate is achieved. In the prior art, the uplink scheduled UE that is transmitting data needs to be instructed to apply puncturing in a fixed position of a subframe whenever a new uplink scheduled UE appears in a wireless communication system, resulting in a technical problem of a low transmission rate, which is solved in the present disclosure.

BRIEF DESCRIPTION OF THE DRAWINGS

The drawings described herein are provided for a further understanding of the present disclosure, and constitute part of this present disclosure. The illustrative embodiments of the present disclosure and the description thereof are for explaining the present disclosure and do not constitute an undue limitation to the present disclosure. In the drawings.

DESCRIPTION OF EMBODIMENTS

In order to make those skilled in the art better understand the solution of the present disclosure, the technical solutions in the embodiments of the present disclosure are clearly and completely described in the following with reference to the accompanying drawings in the embodiments of the present disclosure. It is apparent that the described embodiments are only part of the embodiments of the present disclosure, but not all of them. All other embodiments obtained by those of ordinary skill in the art based on the embodiments of the present disclosure without any creative effort shall fall within the scope of protection of the present disclosure.

It should be noted that the terms "first", "second" and the like in the description and claims, as well as the above-mentioned drawings, of the present disclosure are used to distinguish similar objects, but not necessarily used to describe a specific order or precedence order. It should be understood that data used in this way may be interchanged where appropriate so that the embodiments of the present disclosure described herein can be implemented in a sequence other than those illustrated or described herein. The terms "including" and "having" and any variants thereof are intended to cover non-exclusive inclusions. For example, a process, method, system, product, or device that includes a series of steps or units is not necessarily limited to those steps or units that are clearly listed, but may include other steps or units that are not clearly listed or are inherent to such processes, methods, products, or devices.

Embodiment 1

Figure 1:
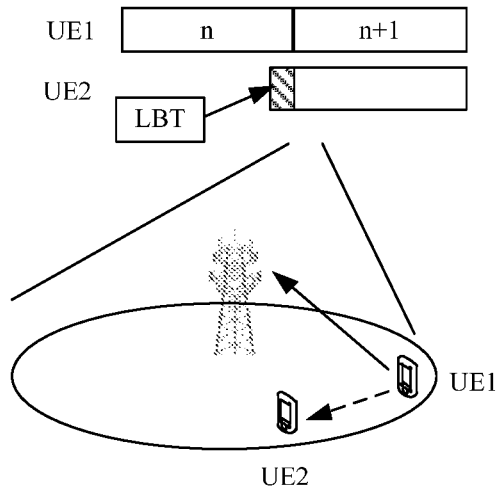
FIG. 1 is a schematic principle view of data transmission by an uplink scheduled UE according to the prior art.
Figure 2:
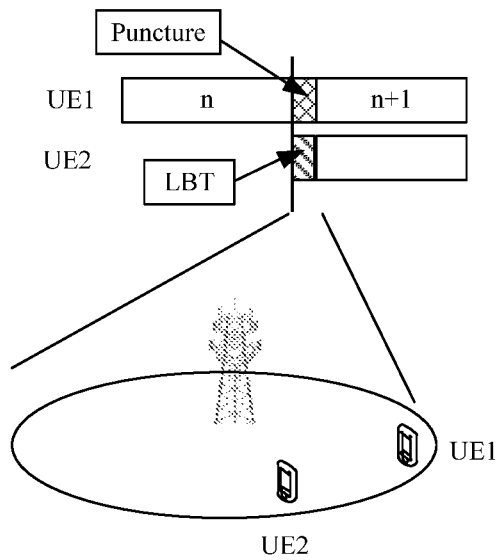
FIG. 2 is an alternative schematic principle view of data transmission by the uplink scheduled UE according to the prior art.
Figure 3:
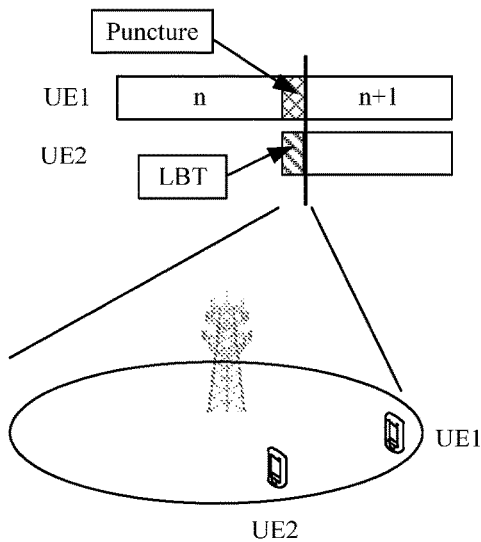
FIG. 3 is another alternative schematic principle view of data transmission by the uplink scheduled UE according to the prior art.
Figure 4:
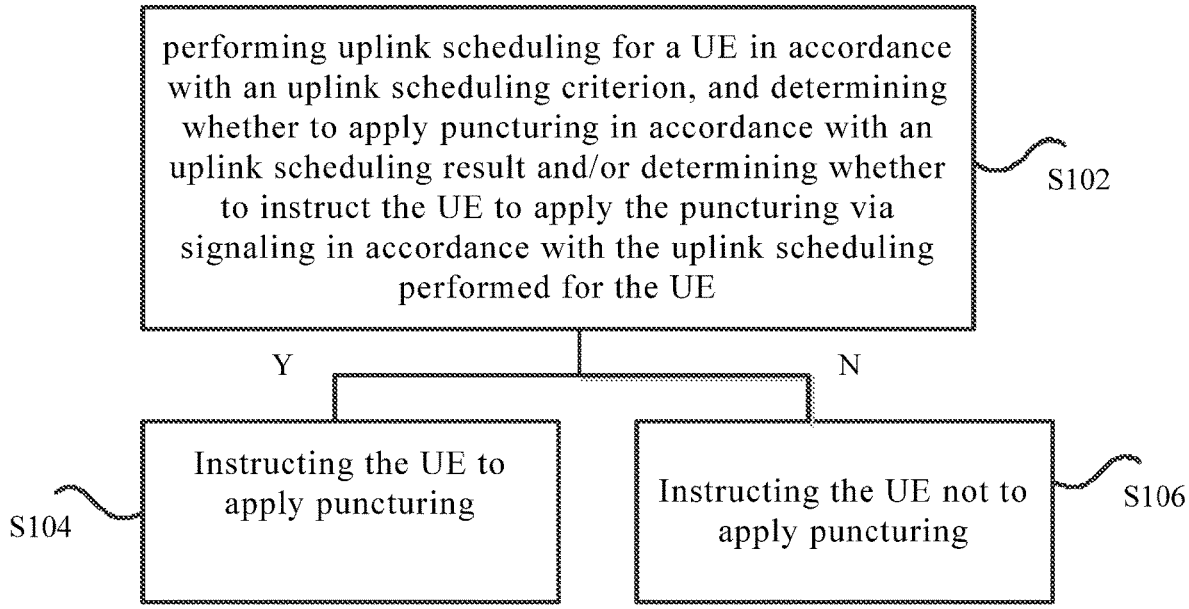
FIG. 4 is a flow chart of a transmission processing method according to an embodiment of the present disclosure.

According to the embodiment of the present disclosure, there is provided a transmission processing method that may be applied to an unlicensed frequency band of a wireless communication system. FIG. 4 is a flow chart of the transmission processing method according to the embodiment of the present disclosure. As shown in FIG. 4, the transmission processing method includes the following steps.

S102 includes performing uplink scheduling for a UE in accordance with an uplink scheduling criterion, and determining whether to apply puncturing in accordance with an uplink scheduling result and/or determining whether to instruct the UE to apply the puncturing via signaling in accordance with the uplink scheduling performed for the UE. The uplink scheduling criterion is preset and is for limiting the uplink scheduled UE to reduce a number of puncturing operations.

S104 is executed when determining or instructing that puncturing needs to be applied. S106 is executed when determining or instructing that puncturing does not need to be applied.

Step 104 includes instructing the UE to apply puncturing.

Step 106 includes instructing the UE not to apply puncturing.

In the embodiment of the present disclosure, whether an uplink scheduled UE applies puncturing or not is limited in accordance with the preset uplink scheduling criterion, or whether the UE applies puncturing or not is instructed via the signaling in accordance with the uplink scheduling applied on the UE, such that it is not necessary to instruct an uplink scheduled UE that is transmitting data to apply puncturing whenever a new uplink scheduled UE appears. Compared with the fact in the prior art that an uplink scheduled UE that is transmitting data needs to be instructed to apply puncturing in a fixed position of a subframe whenever a new uplink scheduled UE appears, the present disclosure achieves the objective of flexibly controlling the number of puncturing operations. Not only is the data transmission rate of the new uplink scheduled UE improved, but also the number of puncturing operations is reduced as much as possible. Thus, the technical effect of improving the data transmission rate is achieved. In the prior art, the uplink scheduled UE that is transmitting data needs to be instructed to apply puncturing in the fixed position of the subframe whenever the new uplink scheduled UE appears in the wireless communication system, resulting in a technical problem of a low transmission rate, which is solved in the present disclosure.

Optionally, the uplink scheduling criterion includes at least one of a first uplink scheduling criterion and a second uplink scheduling criterion. The specific contents of the first uplink scheduling criterion and the second uplink scheduling criterion particularly are as below.

Uplink scheduling criterion I: in a transmitted burst, a set of uplink scheduled UEs in the $(n+1)^{th}$ subframe is a subset of a set of uplink scheduled UEs in the $n^{th}$ subframe.

Particularly, the first uplink scheduling criterion is that the set formed by the uplink scheduled UEs in the $(n+1)^{th}$ subframe is the subset of the set formed by the uplink scheduled UEs in the $n^{th}$ subframe. For example, when the uplink scheduled UEs in the $n^{th}$ subframe are A, B and C, the uplink scheduled UEs in the $(n+1)^{th}$ subframe may only be chosen from A, B and C.

Second uplink scheduling criterion: when the uplink scheduled UEs in the $(n+1)^{th}$ subframe are different from the uplink scheduled UEs in the $n^{th}$ subframe, only a UE that will not be interfered by a reference UE is scheduled; the reference UE is an uplink scheduled UE that performs transmission in both the $n^{th}$ subframe and the $(n+1)^{th}$ subframe when puncturing is applied in a beginning portion of the $(n+1)^{th}$ subframe; and the reference UE is an uplink scheduled UE that performs transmission in the $n^{th}$ subframe when puncturing is applied in an ending portion of the $n^{th}$ subframe.

Optionally, in the embodiment of the present disclosure, particularly, there are the following two methods to determine the UE that will not be interfered by the reference UE.

Method I: determining the UE that will not be interfered by the reference UE in accordance with the location of the UE.

Preferably, the method I may be realized by the following steps S1 to S3.

S1 includes calculating a relative distance between a target UE and the reference UE.

Particularly, the target UE is an uplink scheduled UE that is newly added to the $(n+1)^{th}$ subframe. That is, compared with the uplink scheduled UEs in the $n^{th}$ subframe, the target UE is the uplink scheduled UE that is newly added to the $(n+1)^{th}$ subframe.

It should be noted that there may be one or more target UEs. If one target UE is provided, the relative distance between the target UE and each reference UE needs to be calculated. The number of the obtained relative distances is equal to the total number of the reference UEs. If the plurality of target UEs is provided, the relative distance between each of the plurality of target UEs and each reference UE needs to be calculated. The number of the obtained relative distances is z times of the number of the reference UEs. Z is the number of the uplink scheduled UEs that are newly added to the $(n+1)^{th}$ subframe.

S3 includes determining that the target UE is the UE that will not be interfered by the reference UE when the relative distance is larger than a distance threshold.

Particularly, the distance threshold may be set as required, for example 5 m. The larger the relative distance is than the distance threshold, the smaller the interference is.

For a certain target UE, if a plurality of relative distances is calculated, the target UE may be determined as the UE that will not be interfered by the reference UE so long as the plurality of relative distances is larger than the distance threshold. Thus, when the target UE performs LBT, the reference UE is instructed not to apply puncturing.

An example is taken for description as below with reference to the foregoing embodiment and the method I: when the distance threshold is Dt, the uplink scheduled UEs in the $n^{th}$ subframe are A, B and C, and the uplink scheduled UEs in the $(n+1)^{th}$ subframe are A, B, E, F, G and H, it may be determined that the target UEs are E, F, G and H; when puncturing is applied in the beginning portion of the $(n+1)^{th}$ subframe, the reference UEs are the uplink scheduled UEs that perform transmission in both the $n^{th}$ subframe and the $(n+1)^{th}$ subframe, namely A and B; and when puncturing is applied in the ending portion of the $n^{th}$ subframe, the reference UEs are the uplink scheduled UEs that applying puncturing in the $n^{th}$ subframe, namely A, B and C. The following is an example of a case that puncturing is applied in the beginning portion of the $(n+1)^{th}$ subframe: as for E, the relative distances between E and the reference UEs A and B are respectively calculated first to obtain two relative distances, namely D1 and D2; D1 and D2 are respectively compared with Dt; if D1 and D2 are larger than Dt, it means that E is the UE that will not be interfered by the reference UEs, and E may be scheduled, such that when E performs LBT, A and B are instructed not to apply puncturing; if one of the relative distances of D1 and D2 is smaller than Dt, it means E is the UE that may be interfered by the reference UEs; assuming that D1 is larger than Dt and D2 is smaller than Dt, E is not scheduled, and the UEs that will not be interfered by the reference UEs (A and B) are chosen from the uplink scheduled UEs (target UEs F, G and H) that are newly added to the $(n+1)^{th}$ subframe for scheduling, so that an uplink scheduling result is adjusted, and A and B are instructed not to apply puncturing. Similarly, as for the case that puncturing is applied in the beginning portion of the $(n+1)^{th}$ subframe, the process of determining whether to schedule F, G and H or not may refer to the process of determining whether to schedule E, which will not be repeated herein.

The following is an example of the case that puncturing is applied in the ending portion of the $n^{th}$ subframe: as for E, the relative distances between E and the reference UEs A, B and C are respectively calculated first to obtain three relative distances, namely D7, D8 and D9; D7, D8 and D9 are respectively compared with Dt; if D7, D8 and D9 are larger than Dt, it means that E is the UE that will not be interfered by the reference UEs, and E may be scheduled, such that when E performs LBT, A, B and C are instructed not to apply puncturing; if one of D7, D8 and D9 is smaller than Dt, it means E is the UE that may be interfered by the reference UEs; assuming that D7 is larger than Dt and D8 and D9 are smaller than Dt, E is not scheduled, and the UEs that will not be interfered by the reference UEs (A, B and C) are chosen from the uplink scheduled UEs (target UEs F, G and H) that are newly added to the $(n+1)^{th}$ subframe for scheduling, so that an uplink scheduling result is adjusted, and A, B and C are instructed not to apply puncturing. Similarly, as for the case that puncturing is applied in the ending portion of the $n^{th}$ subframe, the process of determining whether to schedule F, G and H or not may refer to the process of determining whether to schedule E, which will not be repeated herein.

It should be noted that if all of the plurality of uplink scheduled UEs that is newly added to the $(n+1)^{th}$ subframe are the UEs that may be interfered by the reference UEs, the plurality of uplink scheduled UEs that is newly added may not be scheduled.

It can be known from the above content that if the set of the uplink scheduled UEs in the $(n+1)^{th}$ subframe is not the subset of the set of the uplink scheduled UEs in the $n^{th}$ subframe, the UEs that will not be interfered by the reference UEs in the uplink scheduled UEs that are newly added to the $(n+1)^{th}$ subframe need to be scheduled. In this way, instructing the uplink scheduled UEs in the $n^{th}$ subframe to apply puncturing is avoided. Thus, the number of puncturing operations is reduced.

Method II: determining the UE that will not be interfered by the reference UE in accordance with a report reported by the UE.

Preferably, the method II may be realized by the following steps S5 to S7.

S5 includes acquiring RSSI information of a target UE when the reference UE performs transmission.

RSSI is an abbreviation of Received Signal Strength Indicator and has the Chinese name of "接收信号强度指示 (Jieshou Xinhao Qiangdu Zhishi in pinyin)".

Particularly, the target UE is the uplink scheduled UE that is newly added to the $(n+1)^{th}$ subframe. That is, compared with the uplink scheduled UEs in the $n^{th}$ subframe, the target UE is the uplink scheduled UE that is newly added to the $(n+1)^{th}$ subframe.

Similarly, there may be one or more target UEs. If one target UE is provided, the RSSI information of the target UE when each reference UE performs transmission needs to be acquired. The number of the obtained RSSI information is equal to the total number of the reference UEs. If a plurality of target UEs is provided, the RSSI information of each of the plurality of target UEs when each reference UE performs transmission needs to be calculated. The number of the obtained RSSI information is z times of the number of the reference UEs. Z is the number of the uplink scheduled UEs that are newly added to the $(n+1)^{th}$ subframe.

S7 includes determining that the target UE is the UE that will not be interfered by the reference UE when a received signal strength indicated by the RSSI information is lower than an LBT threshold value.

Particularly, the LBT threshold value may be set as required. The lower the received signal strength indicated by the RSSI information is than the LBT threshold value, the smaller the interference is.

For a certain target UE, if a plurality of RSSIs is acquired, the target UE may be determined as the UE that will not be interfered by the reference UE so long as the received signal strengths indicated by the plurality of RSSIs are lower than the LBT threshold value. Thus, when the target UE performs LBT, the reference UE is instructed not to apply puncturing.

An example is taken for description as below with reference to the foregoing embodiment and the method II: when the LBT threshold value is Dm, the uplink scheduled UEs in the $n^{th}$ subframe are A, B and C, and the uplink scheduled UEs in the $(n+1)^{th}$ subframe are A, B, M, N and P, it may be determined that the target UEs are M, N and P; when puncturing is applied in the beginning portion of the $(n+1)^{th}$ subframe, the reference Ues are the uplink scheduled UEs that perform transmission in both the $n^{th}$ subframe and the $(n+1)^{th}$ subframe, namely A and B; and when puncturing is applied in the ending portion of the $n^{th}$ subframe, the reference UEs are the uplink scheduled UEs that perform transmission in both the $n^{th}$ subframe, namely A, B and C.

The following is an example of a case that puncturing is applied in the beginning portion of the $(n+1)^{th}$ subframe: as for M, RSSIs of M when A, B and C perform transmission are respectively acquired first to obtain received signal strengths indicated by the three RSSIs, namely, D4, D5 and D6; D4, D5 and D6 are respectively compared with Dm; if D4, D5 and D6 are smaller than Dm, it means that M is the UE that will not be interfered by the reference UEs, and M may be scheduled, such that when M performs LBT, A, B and C are instructed not to apply puncturing; if one of D4, D5 and D6 is larger than Dm, it means M is the UE that may be interfered by the reference UEs; assuming that D4 and D5 are smaller Dm and D6 is larger than Dm, M is not scheduled, and the UEs that will not be interfered by A, B and C are chosen from the uplink scheduled UEs (target UEs N and P) that are newly added to the $(n+1)^{th}$ subframe for scheduling, so that an uplink scheduling result is adjusted, and A, B and C are instructed not to apply puncturing. Similarly, as for the case that puncturing is applied in the ending portion of the $n^{th}$ subframe, the process of determining whether to schedule N and P or not may refer to the process of determining whether to schedule M, which will not be repeated herein.

The following is an example of the case where puncturing is applied in the beginning portion of the $(n+1)^{th}$ subframe: as for M, the RSSIs of M when A and B perform transmission are acquired first, and then, received signal strengths indicated by the two RSSIs are respectively D10 and D11; D10 and D11 are respectively compared with Dm; if D10 and D11 are smaller than Dm, it means that M is the UE that will not be interfered by the reference UEs, and M may be scheduled, such that when M performs LBT, A and B are instructed not to apply puncturing; if one of D10 and D11 is larger than Dt, it means M is the UE that may be interfered by the reference UEs; assuming that D10 and D11 are smaller than Dm, M is not scheduled, and the UEs that will not be interfered by A and B are chosen from the uplink scheduled UEs (target UEs N and P) that are newly added to the $(n+1)^{th}$ subframe for scheduling, so that an uplink scheduling result is adjusted, and A and B are instructed not to apply puncturing. Similarly, as for the case where puncturing is applied in the beginning portion of the $(n+1)^{th}$ subframe, the process of determining whether to schedule N and P or not may refer to the process of determining whether to schedule M, which will not be repeated herein.

Optionally, in the embodiment of the present disclosure, said determining whether to instruct the UE to apply the puncturing via signaling in accordance with the uplink scheduling performed for the UE includes: comparing the uplink scheduled UEs in the $(n+1)^{th}$ subframe with the uplink scheduled UEs in the $n^{th}$ subframe to obtain the uplink scheduling result, and instructing whether to apply puncturing in accordance with the uplink scheduling result.

Particularly, the uplink scheduling result is a comparison result that is obtained by comparing the uplink scheduled UEs in the $(n+1)^{th}$ subframe with the uplink scheduled UEs in the $n^{th}$ subframe. The content of said comparing the uplink scheduled UEs in the $(n+1)^{th}$ subframe with the uplink scheduled UEs in the $n^{th}$ subframe includes the following two aspects: (1) in comparison with the uplink scheduled UEs in the $n^{th}$ subframe, determining whether the $(n+1)^{th}$ subframe has the newly added uplink scheduled UEs or not; and (2) if yes, determining whether the newly added uplink scheduled UEs are the UEs that will not be interfered by the reference UEs in the above-mentioned embodiment.

Optionally, said determining whether to instruct the UE to apply the puncturing via signaling in accordance with the uplink scheduling performed for the UE particularly includes the following steps S9 to S13.

S9 includes comparing the uplink scheduled UEs in the $(n+1)^{th}$ subframe with the uplink scheduled UEs in the $n^{th}$ subframe to obtain the uplink scheduling result.

S11 includes if the uplink scheduling result meets the uplink scheduling criterion, determining to instruct the reference UE not to apply puncturing via the signaling. The uplink scheduling criterion is preset and is for limiting the uplink scheduled UEs to reduce the number of puncturing operations. The reference UE is the uplink scheduled UE that performs transmission in both the $n^{th}$ subframe and the $(n+1)^{th}$ subframe when puncturing is applied in the beginning portion of the $(n+1)^{th}$ subframe. The reference UE is the uplink scheduled UE that performs transmission in the $n^{th}$ subframe when puncturing is applied in the ending portion of the $n^{th}$ subframe.

S13 includes if the uplink scheduling result does not meet the uplink scheduling criterion, determining to instruct the reference UE to apply puncturing via the signaling.

Further optionally, the uplink scheduling criterion includes a first uplink scheduling criterion and a second uplink scheduling criterion.

S11: if the uplink scheduling result meets the uplink scheduling criterion, determining to instruct the reference UE not to apply puncturing via the signaling includes the following step S11-1.

S11-1 includes: if the uplink scheduling result meets the first uplink scheduling criterion or the second uplink scheduling criterion, determining to instruct the reference UE not to apply puncturing via the signaling. The first uplink scheduling criterion is that in a transmitted burst, the set of uplink scheduled UEs in the $(n+1)^{th}$ subframe is the subset of the set of uplink scheduled UEs in the $n^{th}$ subframe. The second uplink scheduling criterion is that when the uplink scheduled UEs in the $(n+1)^{th}$ subframe are different from the uplink scheduled UEs in the $n^{th}$ subframe, only the UE that will not be interfered by the reference UE is scheduled.

If the uplink scheduling result meets the first uplink scheduling criterion, it means that the $(n+1)^{th}$ subframe has no newly added uplink scheduled UE. In other words, when the set of the uplink scheduled UEs in the $(n+1)^{th}$ subframe is the subset of the set of the uplink scheduled UEs in the $n^{th}$ subframe, the UE is instructed not to apply puncturing via signaling.

If the uplink scheduling result meets the second uplink scheduling criterion, it means that there are UEs that will not be interfered by the reference UEs in the newly added uplink scheduled UEs in the $(n+1)^{th}$ subframe, such that a base station only needs to perform uplink scheduling for the UEs that will not be interfered by the reference UEs. The reference UEs are instructed not to apply puncturing via the signaling. Refer to the above embodiment for the meanings and the determination modes of the reference UEs and the UEs that will not be interfered by the reference UEs.

If the uplink scheduling result does not meet the uplink scheduling criterion, said determining to instruct the reference UE to apply puncturing via the signaling includes the following step S13-1.

S13-1 includes if the uplink scheduling result meets none of the first uplink scheduling criterion and the second uplink scheduling criterion, determining to instruct the reference UE to apply puncturing via the signaling.

If the uplink scheduling result meets none of the uplink scheduling criterion and the second uplink scheduling criterion, it means that the $(n+1)^{th}$ subframe has the newly added uplink scheduled UEs. In other words, the set of uplink scheduled UEs in the $(n+1)^{th}$ subframe is not the subset of the set of the uplink scheduled UEs in the $n^{th}$ subframe, and the newly added uplink scheduled UEs are the UEs that may be interfered by the reference UEs. Thus, the reference UEs need to be instructed to apply puncturing via the signaling.

In the following, a UE in a cell is taken as an example. There are three methods of instructing the UE whether to apply puncturing via signaling, namely, explicit indication, implicit indication and joint indication, which will be respectively described next.

Method I: Explicit Indication

Said determining whether to instruct the UE to apply the puncturing via signaling in accordance with the uplink scheduling performed for the UE includes the following steps A to B.

Step A includes defining a first control signaling of puncturing information of all UEs in a target cell subsequent to the $x^{th}$ subframe. The target cell is a cell covered by a base station. X is greater than or equal to 0.

Optionally, the first control signaling is a common physical downlink control channel CPDCCH.

Step B includes adding a bit into the first control signaling to indicate the puncturing information.

Optionally, said step B of adding the bit into the first control signaling to indicate the puncturing information includes: when the value of the bit is a first result, instructing the reference UE not to apply puncturing; and when the value of the bit is a second result, instructing the reference UE to apply puncturing. The first result is different from the second result.

The first result may be 0 or 1. The second result is 1 when the first result is 0. The second result is 0 when the first result is 1.

Method II: Implicit Indication

Said determining whether to instruct the UE to apply the puncturing via signaling in accordance with the uplink scheduling performed for the UE includes the following steps C to D.

Step C includes defining a first control signaling to indicate puncturing information of all UEs in a target cell subsequent to the $x^{th}$ subframe. The target cell is a cell covered by a base station. X is greater than or equal to 0.

Step D includes setting a target message bit in the first control signaling for indicating the puncturing information.

Optionally, said step D of setting the target message bit in the first control signaling for indicating the puncturing information includes: when the target message bit exists in a specific format, instructing the reference UE to apply puncturing; and when the target message bit exists not in a specific format, instructing the reference UE not to apply puncturing.

Optionally, said step D of setting the target message bit in the first control signaling for indicating the puncturing information includes any of the followings: reserving a number of at least one control channel element CCE, instructing the UE to apply puncturing when the CCE is the reserved number, and instructing the UE not to apply puncturing when the CCE is not the reserved number; if a preset cyclic redundancy check CRC is adopted, instructing the UE to apply puncturing, and if the preset cyclic redundancy check CRC is not adopted, instructing the UE not to apply puncturing; and if a CRC is not adopted, instructing the UE to apply puncturing, and if the CRC is adopted, instructing the UE not to apply puncturing.

Method III: Joint Indication

Said determining whether to instruct the UE to apply the puncturing via signaling in accordance with the uplink scheduling performed for the UE includes the following steps E to F.

Step E includes defining a first control signaling to indicate puncturing information of all UEs in a target cell subsequent to the $x^{th}$ subframe. The target cell is a cell covered by a base station. X is greater than or equal to 0.

Step F includes combining the puncturing information in the first control signaling with a target bit message for encoding to indicate the puncturing information.

Optionally, said step F of combining the puncturing information in the first control signaling with the target bit message for encoding to indicate the puncturing information includes: performing joint encoding on the puncturing information in the first control signaling and a current bit message that indicates a subframe length, and simultaneously indicating the subframe length and the puncturing information.

For example, when 01 or 00 is instructed, puncturing is applied; and when 10 or 11 is instructed, puncturing is not applied.

Optionally, said determining whether to instruct the UE to apply the puncturing via signaling in accordance with the uplink scheduling performed for the UE includes: comparing the uplink scheduled UEs in the $(n+1)^{th}$ subframe with the uplink scheduled UEs in the $n^{th}$ subframe, and analyzing an interfering UE of an uplink scheduled UE that is newly added to the $(n+1)^{th}$ subframe. It is determined to instruct the interfering UE to apply puncturing via the signaling if the interfering UE is the uplink scheduled UE that performs transmission in both the $n^{th}$ subframe and the $(n+1)^{th}$ subframe. Otherwise, it is determined to instruct the interfering UE not to apply puncturing via the signaling.

For example, when the uplink scheduled UEs in the $n^{th}$ subframe are A, B and C, and the uplink scheduled UEs in the $(n+1)^{th}$ subframe are A, B, C and D, D is the uplink scheduled UE that is newly added to the $(n+1)^{th}$ subframe. Assuming that in accordance with the methods provided by the foregoing embodiment, D is determined as the UE that may be interfered by A but not B or C. Thus, it is concluded that A is the interfering UE and B and C are the non-interfering UEs.

Particularly, the interfering UE in the above embodiment is the UE, which interferes the uplink scheduled UE that is newly added to the $(n+1)^{th}$ subframe, in the reference UEs. Particularly, the interfering UE is the UE, which really interferes the uplink scheduled UE that is newly added to the $(n+1)^{th}$ subframe, in the reference UEs, and may be part or all of the reference UEs. The non-interfering UE is the UE, which may interfere the uplink scheduled UE that is newly added to the $(n+1)^{th}$ subframe, and the interfering UE may be part or all of the reference UEs.

In the following, a certain UE is taken as an example. There are also three methods of instructing the UE whether to apply puncturing via the signaling, namely, explicit indication, implicit indication and joint indication, which will be respectively described next.

Method I: Explicit Indication

Said determining whether to instruct the UE to apply the puncturing via signaling in accordance with the uplink scheduling performed for the UE includes the following steps G to H.

Step G includes defining a second control signaling to indicate a puncturing information of a certain UE subsequent to the $x^{th}$ subframe. X is greater than or equal to 0.

Optionally, the second control signaling is a UL Grant or enhanced common physical downlink control channel (e)PDCCH.

Particularly, the certain UE in the embodiment and the following embodiments may mean not only the interfering UE in the above embodiment and the non-interfering UE.

Step H includes adding a bit into the second control signaling to indicate the puncturing information.

Optionally, said step H of adding the bit into the second control signaling to indicate the puncturing information includes: when the value of the bit is a first result, instructing the certain UE not to apply puncturing; and when the value of the bit is a second result, instructing the certain UE to apply puncturing. The first result is different from the second result.

The first result may be 0 or 1. The second result is 1 when the first result is 0. The second result is 0 when the first result is 1.

Method II: Implicit Indication

Said determining whether to instruct the UE to apply the puncturing via signaling in accordance with the uplink scheduling performed for the UE includes the following steps I to J.

Step I includes defining a second control signaling to indicate a puncturing information of a certain UE subsequent to the $x^{th}$ subframe. X is greater than or equal to 0.

Step J includes setting a target message bit in the second control signaling for indicating the puncturing information.

Optionally, said step J of setting the target message bit in the second control signaling for indicating the puncturing information includes: when the target message bit exists in a specific format, instructing the certain UE to apply puncturing; and when the target message bit exists not in a specific format, instructing the certain UE not to apply puncturing.

Optionally, said step J of setting the target message bit in the second control signaling for indicating the puncturing information includes any of the followings: reserving a number of at least one control channel element CCE, instructing the UE to apply puncturing when the CCE is the reserved number, and instructing the UE not to apply puncturing when the CCE is not the reserved number; if a preset cyclic redundancy check CRC is adopted, instructing the UE to apply puncturing, and if the preset cyclic redundancy check CRC is not adopted, instructing the UE not to apply puncturing; and if a CRC is not adopted, instructing the UE to apply puncturing, and if the CRC is adopted, instructing the UE not to apply puncturing.

Method III: Joint Indication

Said determining whether to instruct the UE to apply the puncturing via signaling in accordance with the uplink scheduling performed for the UE includes the following steps K to L.

Step K includes defining a second control signaling to indicate a puncturing information of a certain UE subsequent to the $x^{th}$ subframe. X is greater than or equal to 0.

Step L includes combining the puncturing information in the second control signaling with a target bit message for encoding to indicate the puncturing information.

Optionally, said step L of combining the puncturing information in the second control signaling with the target bit message for encoding to indicate the puncturing information includes: performing joint encoding on the puncturing information in the second control signaling and a current bit message that indicates a subframe length, and simultaneously indicating the subframe length and the puncturing information.

Optionally, said determining whether to instruct the UE to apply the puncturing via signaling in accordance with the uplink scheduling performed for the UE includes: comparing the uplink scheduled UEs in the $(n+1)^{th}$ subframe with the uplink scheduled UEs in the $n^{th}$ subframe, and analyzing an interfering UE of an uplink scheduled UE that is newly added to the $(n+1)^{th}$ subframe. If the interfering UE is the uplink scheduled UE that performs transmission in the $n^{th}$ subframe and the $(n+1)^{th}$ subframe, the interfering UE is grouped as an interfering UE group and a non-interfering UE is grouped as a non-interfering UE group. It is determined to instruct all uplink scheduled UEs in the interfering UE group to apply puncturing via the signaling and all uplink scheduled UEs in the non-interfering UE group not to apply puncturing via the signaling.

Particularly, the interfering UE in the above embodiment is the UE, which interferes the uplink scheduled UE that is newly added to the $(n+1)^{th}$ subframe, in the uplink scheduled UEs in the $n^{th}$ subframe. The non-interfering UE is the UE, which may not interfere the uplink scheduled UE that is newly added to the $(n+1)^{th}$ subframe, in the uplink scheduled UEs in the $n^{th}$ subframe.

For example, when the uplink scheduled UEs in the $n^{th}$ subframe are A, B and C, and the uplink scheduled UEs in the $(n+1)^{th}$ subframe are A, B, C and D, D is the uplink scheduled UE that is newly added to the $(n+1)^{th}$ subframe. Assume that in accordance with the methods provided by the foregoing embodiment, D is determined as the UE that may be interfered by A and C but not B. It is concluded that A and C are the interfering UEs and B is the non-interfering UE. Thus, A and C may be in the interfering UE group. B may be in the non-interfering UE group.

In the following, a UE group is taken as an example. For UEs in the UE group, there are also three methods of instructing the UE whether to apply puncturing via the signaling, namely, explicit indication, implicit indication and joint indication, which will be respectively described next.

Method I: Explicit Indication

Said determining whether to instruct the UE to apply the puncturing via signaling in accordance with the uplink scheduling performed for the UE includes the following steps M to N.

Step M includes defining a third control signaling to indicate puncturing information of a group of UEs subsequent to the $x^{th}$ subframe.

Optionally, the third control signaling is a Group UL Grant or enhanced group physical downlink control channel Group (e)PDCCH.

Particularly, the group of UEs in the embodiment and the following embodiments may mean not only UEs in the interfering UE group but also UEs in the non-interfering UE group.

Step N includes adding a bit into the third control signaling to indicate the puncturing information.

Optionally, said step N of adding the bit into the third control signaling to indicate the puncturing information includes: when the value of the bit is a first result, instructing all the UEs in the group of UEs not to apply puncturing; and when the value of the bit is a second result, instructing all the UEs in the group of UEs to apply puncturing. The first result is different from the second result.

Method II: Implicit Indication

Said determining whether to instruct the UE to apply the puncturing via signaling in accordance with the uplink scheduling performed for the UE includes the following steps O to P.

Step O includes defining a third control signaling to indicate puncturing information of the group of UEs subsequent to the $x^{th}$ subframe. X is greater than or equal to 0.

Step P includes setting a target message bit in the third control signaling for indicating the puncturing information.

Optionally, said step P of setting the target message bit in the first control signaling for indicating the puncturing information includes: when the target message bit exists in a specific format, instructing all the UEs in the group of UEs to apply puncturing; and when the target message bit exists not in a specific format, instructing all the UEs in the group of UEs not to apply puncturing.

Optionally, said step P of setting the target message bit in the first control signaling for indicating the puncturing information includes any of the followings: reserving a number of at least one control channel element CCE, instructing the UE to apply puncturing when the CCE is the reserved number, and instructing the UE not to apply puncturing when the CCE is not the reserved number; if a preset cyclic redundancy check CRC is adopted, instructing the UE to apply puncturing, and if the preset cyclic redundancy check CRC is not adopted, instructing the UE not to apply puncturing; and if a CRC is not adopted, instructing the UE to apply puncturing, and if the CRC is adopted, instructing the UE not to apply puncturing.

Method III: Joint Indication

Said determining whether to instruct the UE to apply the puncturing via signaling in accordance with the uplink scheduling performed for the UE includes the following steps Q to R.

Step Q includes defining a third control signaling to indicate puncturing information of a group of UEs subsequent to the $x^{th}$ subframe.

Step R includes combining the puncturing information in the third control signaling with a target bit message for encoding to indicate the puncturing information.

Optionally, said step R of combining the puncturing information in the third control signaling with a target bit message for encoding to indicate the puncturing information includes: performing joint encoding on the puncturing information in the third control signaling and a current bit message that indicates a subframe length, and simultaneously indicating the subframe length and the puncturing information.

Optionally, said determining whether to instruct the UE to apply the puncturing via signaling in accordance with the uplink scheduling performed for the UE includes: instructing the UE not to apply puncturing via the signaling if frame configuration of a wireless communication system by default is frame configuration for puncturing; instructing the UE to apply puncturing via signaling if the frame configuration of the wireless communication system by default is frame configuration not for puncturing; and instructing the UE to apply or not to apply puncturing via the signaling if the wireless communication system has two frame configuration formats by default.

Particularly, if the frame configuration of the wireless communication system by default is the frame configuration for puncturing, but an instruction of not applying puncturing is needed, the UE needs to be instructed not to apply puncturing via the signaling. If the frame configuration of the wireless communication system by default is the frame configuration not for puncturing, but an instruction of applying puncturing is needed, the UE needs to be instructed to apply puncturing via the signaling.

Embodiment 2

In a transmission processing method provided by the embodiment of the present disclosure, the data transmission probability of a UE that is performing transmission is improved and the time period of puncturing is reduced as much as possible by adjusting an uplink scheduling result and/or instructing a UE whether to apply puncturing or not via signaling.

Said adjusting the uplink scheduling result and/or instructing the UE whether to apply puncturing via the signaling mainly includes the following two methods:

Method I: setting an uplink scheduling criterion and limiting uplink scheduled UEs to reduce the number of puncturing operations.

Particularly, the following two uplink scheduling criteria are set.

First Criterion: in a transmitted burst, a set of uplink scheduled UEs in the $(n+1)^{th}$ subframe is a subset of a set of uplink scheduled UEs in the $n^{th}$ subframe.

Second Criterion: when the uplink scheduled UEs in the $(n+1)^{th}$ subframe are different from the uplink scheduled UEs in the $n^{th}$ subframe, only a UE that will not be interfered by a reference UE is scheduled; the reference UE is the uplink scheduled UE that performs transmission in both the $n^{th}$ subframe and the $(n+1)^{th}$ subframe when puncturing is applied in a beginning portion of the $(n+1)^{th}$ subframe; and the reference UE is the uplink scheduled UE that performs transmission in the $n^{th}$ subframe when puncturing is applied in an ending portion of the $n^{th}$ subframe.

Particularly, that the UEs may not interfere with one another may be judged by any of the following two methods.

1: A judgment is made according to UE locations. For example, the UEs whose relative distances exceed a certain threshold will not interfere with one another.

2: A judgment is made according to UE reports. Particularly, the UEs may report metrical information, for example, RSSI (Received Signal Strength Indicator). A base station makes the judgment through RSSI information reported by the UEs and transmitting statuses of the ambient UEs.

Method II: not limiting the uplink scheduling result, comparing scheduled UEs in the $(n+1)^{th}$ subframe with scheduled UEs in the $n^{th}$ subframe, and indicating puncturing information in accordance with the uplink scheduling result.

In the followings, UEs, a certain UE and a group of UEs in a cell are respectively taken as an example to explain the above method II.

Details are as below.

2.1: Cell-Specific indicates whether to apply puncturing or not. That is, the UEs in the cell are taken as an example to explain whether to apply puncturing or not.

For example, the base station schedules uplink UEs and compares the scheduled UEs in the $(n+1)^{th}$ subframe with the scheduled UEs in the $n^{th}$ subframe. If the uplink scheduling result meets any of the forgoing criteria, the base station notifies the UEs not to apply puncturing. If the uplink scheduling result meets none of the criteria, the base station notifies the UEs to apply puncturing.

There are the following three specific methods by which the UEs are instructed (or notified) whether to apply puncturing.

2.1.1 Explicit Indication

First, defining a CPDCCH to indicate puncturing information of all UEs in the cell subsequent to the $x^{th}$ subframe.

Second: adding a bit into the CPDCCH to indicate the puncturing information. For example, puncturing is not applied when a certain bit is 0, and is performed when a certain bit is 1 and vice versa.

2.1.2 Implicit Indication:

First, defining a CPDCCH to indicate puncturing information of all UEs in the cell subsequent to the $x^{th}$ subframe.

Second: setting some message bits in a common PDCCH, applying puncturing when the message bits exist in specific formats and not applying puncturing when the message bits exist not in specific formats. For example, in a specific method I, number locations of some CCEs are reserved, puncturing is applied when the CCEs are reserved numbers, and not performed when the CCEs are not the reserved numbers. In a specific method II, puncturing is applied when a specific CRC is adopted, and not performed when other CRCs are adopted. In a specific method III, puncturing is applied when a CRC is not adopted and not performed when the CRC is adopted.

2.1.3 Joint Indication

First, defining a CPDCCH to indicate puncturing information of all UEs in the cell subsequent to the $x^{th}$ subframe.

Second, in the common PDCCH, combing the puncturing information with other bit messages for encoding to indicate the puncturing information. For example, joint encoding is performed on the puncturing information and the bit messages that indicate subframe lengths, and the subframe lengths and the puncturing information are simultaneously indicated.

2.2: UE-Specific indicates whether to apply puncturing or not. That is, a certain UE is taken as an example to explain whether to apply puncturing or not.

The base station schedules uplink UEs, compares the scheduled UEs in the $(n+1)^{th}$ subframe with the scheduled UEs in the $n^{th}$ subframe, and analyzes an interfering UE of newly scheduled UEs in the $(n+1)^{th}$ subframe. If the interfering UE is the UE that performs transmission in both the $n^{th}$ subframe and the $(n+1)^{th}$ subframe, the interfering UE is instructed to apply puncturing. Otherwise, puncturing is not applied.

There are the following three specific methods by which the UEs are instructed whether to apply puncturing.

2.2.1 Explicit Indication

First, defining a UL Grant or (e)PDCCH to indicate a puncturing information of a certain UE subsequent to the $x^{th}$ subframe.

Second: adding a bit into the UL Grant or (e)CPDCCH to indicate the puncturing information. For example, puncturing is not applied when a certain bit is 0, and is performed when a certain bit is 1 and vice versa.

2.2.2 Implicit Indication

First, defining a UL Grant or (e)PDCCH to indicate a puncturing information of a certain UE subsequent to the $x^{th}$ subframe.

Second: setting some message bits in a UL Grant or (e)PDCCH, applying puncturing when the message bits exist in specific formats and not applying puncturing when the message bits exist not in specific formats. For example, in a specific method I, number locations of some CCEs are reserved, puncturing is applied when the CCEs are reserved numbers, and not performed when the CCEs are not the reserved numbers. In a specific method II, puncturing is applied when a specific CRC is adopted, and not performed when other CRCs are adopted. In a specific method III, puncturing is applied when a CRC is not adopted and not performed when the CRC is adopted.

2.2.3 Joint Indication

First, defining a UL Grant or (e)PDCCH to indicate a puncturing information of a certain UE subsequent to the $x^{th}$ subframe.

Second, in the UL Grant or (e)PDCCH, combing the puncturing information with other bit messages for encoding to indicate the puncturing information.

For example, joint encoding is performed on the puncturing information and the bit messages that indicate subframe lengths, and the subframe lengths and the puncturing information are simultaneously indicated.

2.3: Group-Specific indicates whether to apply puncturing or not. That is, a certain group of UEs are taken as an example to explain whether to apply puncturing or not.

The base station schedules uplink UEs, compares the scheduled UEs in the $(n+1)^{th}$ subframe with the scheduled UEs in the $n^{th}$ subframe, and analyzes an interfering UE of newly scheduled UEs in the $(n+1)^{th}$ subframe. If the interfering UE is the UE that performs transmission in both the $n^{th}$ subframe and the $(n+1)^{th}$ subframe, the interfering UE is grouped as an interference UE group. All UEs in the interfering UE group are instructed by a control message to apply puncturing. A non-interfering UE group is instructed by the control message not to apply puncturing.

There are the following three specific methods by which the UEs are instructed (or notified) whether to apply puncturing.

2.3.1 Explicit Indication

First, defining a Group UL Grant or Group (e)PDCCH to indicate puncturing information of a group of UEs subsequent to the $x^{th}$ subframe.

Second: adding a bit into the Group UL Grant or Group (e)PDCCH to indicate the puncturing information. For example, puncturing is not applied when a certain bit is 0, and is performed when a certain bit is 1 and vice versa.

2.3.2 Implicit Indication

First, defining a Group UL Grant or Group (e)PDCCH to indicate puncturing information of a group of UEs subsequent to the $x^{th}$ subframe.

Second: setting some message bits in the Group UL Grant or Group (e)PDCCH, applying puncturing when the message bits exist in specific formats and not applying puncturing when the message bits exist not in specific formats. For example, in a specific method I, number locations of some CCEs are reserved, puncturing is applied when the CCEs are reserved numbers, and not performed when the CCE are not the reserved numbers. In a specific method II, puncturing is applied when a specific CRC is adopted, and not performed when other CRCs are adopted. In a specific method III, puncturing is applied when a CRC is not adopted and not performed when the CRC is adopted.

2.3.3 Joint Indication

First, defining a Group UL Grant or Group (e)PDCCH to indicate puncturing information of a group of UEs subsequent to the $x^{th}$ subframe.

Second, in the Group UL Grant or Group (e)PDCCH, combing the puncturing information with other bit messages for encoding to indicate the puncturing information. For example, joint encoding is performed on the puncturing information and the bit messages that indicate subframe lengths, and the subframe lengths and the puncturing information are simultaneously indicated.

In addition, instruction methods of the puncturing information may be also as below.

I: When a system has a frame configuration for puncturing by default, the only requirement is to instruct the UE not to apply puncturing via the signaling.

II: When the system has a frame configuration not for puncturing by fault, the only requirement is to instruct the UE to apply puncturing via the signaling.

III: When the system has two frame configuration formats, whether to apply puncturing is instructed via the signaling.

It can be known from the above content that the solution provided by the embodiment of the present disclosure may not only improve the data transmission probability of UEs that are performing transmission but also reduce the time period of puncturing as much as possible.

An embodiment of the present disclosure further provides a transmission processing device that is mainly configured to execute the transmission processing method provided by the above embodiment of the present disclosure. The transmission processing device provided by the embodiment of the present disclosure is particularly introduced as below.

Figure 5:
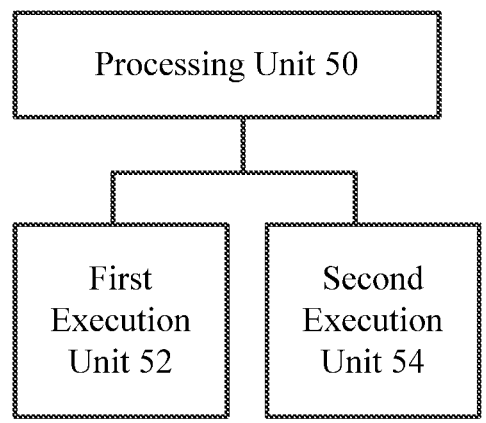
FIG. 5 is a schematic view of a transmission processing device according to an embodiment of the present disclosure.

FIG. 5 is a schematic view of the transmission processing device provided by the embodiment of the present disclosure. As shown in FIG. 5, the transmission processing device mainly includes a processing unit 50, and optionally, further includes a first execution unit 52 and a second execution unit 54.

The processing unit 50 is configured to perform uplink scheduling for a UE in accordance with an uplink scheduling criterion and to determine whether to apply puncturing in accordance with an uplink scheduling result and/or to determine to whether to instruct the UE to apply the puncturing via signaling in accordance with the uplink scheduling performed for the UE. The uplink scheduling criterion is preset and is for limiting the uplink scheduled UEs to reduce a number of puncturing operations The first execution unit 52 is configured to apply puncturing by the UE.

The second execution unit 54 is configured not to apply puncturing by the UE.

In the embodiment of the present disclosure, whether the uplink scheduled UE applies puncturing or not is limited in accordance with the preset uplink scheduling criterion, or whether the UE applies puncturing or not is instructed via the signaling in accordance with the uplink scheduling applied in the UE, such that it is not necessary to instruct an uplink scheduled UE that is transmitting data to apply puncturing whenever a new uplink scheduled UE appears. Compared with the fact in the prior art that an uplink scheduled UE that is transmitting data needs to be instructed to apply puncturing in a fixed position of a subframe whenever a new uplink scheduled UE appears, the present disclosure achieves the objective of flexibly controlling the number of puncturing operations. Not only is the data transmission rate of the new uplink scheduled UE improved, but also the number of puncturing operations is reduced as much as possible. Thus, the technical effect of improving the data transmission rate is achieved. In the prior art, the uplink scheduled UE that is transmitting data needs to be instructed to apply puncturing in a fixed position of a subframe whenever a new uplink scheduled UE appears in a wireless communication system, resulting in a technical problem of a low transmission rate, which is solved in the present disclosure.

Optionally, the uplink scheduling criterion includes at least one of the followings. In a transmitted burst, a set of uplink scheduled UEs in the $(n+1)^{th}$ subframe is a subset of a set of uplink scheduled UEs in the $n^{th}$ subframe. When the uplink scheduled UEs in the $(n+1)^{th}$ subframe are different from the uplink scheduled UEs in the $n^{th}$ subframe, only a UE that will not be interfered by a reference UE is scheduled. The reference UE is the uplink scheduled UE that performs transmission in both the $n^{th}$ subframe and the $(n+1)^{th}$ subframe when the puncturing is applied in a beginning portion of the (n+1)$^{th}$ subframe. The reference UE is the uplink scheduled UE that performs transmission in the n$^{th}$ subframe when puncturing is applied in an ending portion of the n$^{th}$ subframe.

Optionally, the processing unit includes a comparison module, a first determination module and a second determination module. The comparison module is configured to compare the uplink scheduled UEs in the (n+1)$^{th}$ subframe with the uplink scheduled UEs in the n$^{th}$ subframe to obtain the uplink scheduling result. The first determination module is configured to determine to instruct the reference UE not to apply puncturing via the signaling if the uplink scheduling result meets the uplink scheduling criterion. The uplink scheduling criterion is preset and is for limiting the uplink scheduled UEs to reduce the number of puncturing operations. The reference UE is the uplink scheduled UE that performs transmission in both the n$^{th}$ subframe and the (n+1)$^{th}$ subframe when puncturing is applied in the beginning portion of the (n+1)$^{th}$ subframe. The reference UE is the uplink scheduled UE that performs transmission in the n$^{th}$ subframe when puncturing is applied in the ending portion of the n$^{th}$ subframe. The second determination module is configured to determine to instruct the reference UE to apply puncturing via the signaling if the uplink scheduling result does not meet the uplink scheduling criterion.

Optionally, the processing unit includes a first processing module. The first processing module is configured to compare the uplink scheduled UEs in the (n+1)$^{th}$ subframe with the uplink scheduled UEs in the n$^{th}$ subframe and to analyze an interfering UE of an uplink scheduled UE that is newly added to the (n+1)$^{th}$ subframe. It is determined to instruct the interfering UE to apply puncturing via the signaling if the interfering UE is the uplink scheduled UE that performs transmission in both the n$^{th}$ subframe and the (n+1)$^{th}$ subframe. Otherwise, it is determined to instruct the interfering UE not to apply puncturing via the signaling.

Optionally, the processing unit includes a second processing module. The second processing module is configured to compare the uplink scheduled UEs in the (n+1)$^{th}$ subframe with the uplink scheduled UEs in the n$^{th}$ subframe and to analyze an interfering UE of an uplink scheduled UE that is newly added to the (n+1)$^{th}$ subframe. If the interfering UE is the uplink scheduled UE that performs transmission in both the n$^{th}$ subframe and the (n+1)$^{th}$ subframe, the interfering UE is grouped as an interfering UE group and a non-interfering UE is grouped as a non-interfering UE group. It is determined to instruct all uplink scheduled UEs in the interfering UE group to apply puncturing via the signaling and all uplink scheduled UEs in the non-interfering UE group not to apply puncturing via the signaling.

Optionally, the processing unit includes any of a first instruction module, a second instruction module and a third instruction module. The first instruction module is configured to instruct the UE not to apply puncturing via the signaling if frame configuration of a wireless communication system by default is frame configuration for puncturing. The second instruction module is configured to instruct the UE to apply puncturing via the signaling if the frame configuration of the wireless communication system by default is frame configuration not for puncturing. The third instruction module is configured to instruct the UE to apply or not to apply puncturing via the signaling if the wireless communication system has two frame configuration formats by default.

An embodiment further provides a non-transitory computer readable storage medium. The non-transitory computer readable storage medium stores a computer instruction that is configured to cause a computer to execute the method provided by any method embodiment of the present disclosure.

An embodiment of the present disclosure further provides a computer program product. The computer program product includes a computer program that is stored on a non-transitory computer readable storage medium. The computer program includes a program instruction. When the program instruction is executed by a computer, the computer may execute the method provided by any method embodiment of the present disclosure.

Figure 6:
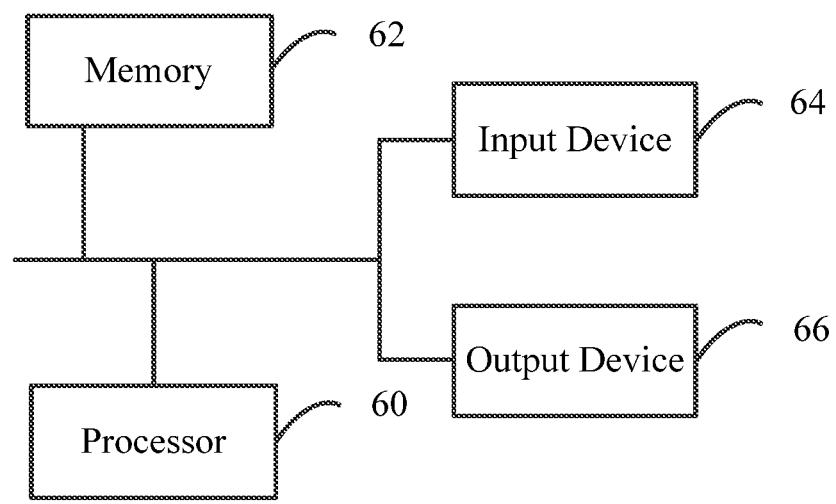
FIG. 6 is a schematic view of a hardware structure of an electronic device that performs a transmission processing method according to an embodiment of the present disclosure.

FIG. 6 is a schematic view of a hardware structure of an electronic device that performs the transmission processing method provided by the embodiment. As shown in FIG. 6, the electronic device includes one or more processors 60 and a memory 62. One processor 60 is taken as an example in FIG. 6

The electronic device may further include an input device 64 and an output device 66.

The processor 60, the memory 62, the input device 64 and the output device 66 may be connected through a bus or by other means. Connection by means of the bus is taken as an example in FIG. 6.

As a non-transitory computer readable storage medium, the memory 62 may be configured to store a non-transitory software program, a non-transitory computer executable program and a module, for example, a program instruction/module (for example, the processing unit 50 as shown in FIG. 5 optionally further includes a first execution unit 52 and a second execution unit 54) corresponding to the transmission processing method in the embodiment of the present disclosure. The processor 60 executes various functional applications and data processing of a server through running of the non-transitory software program, instruction and module stored in the memory 62. That is, the transmission processing method in the above embodiment is realized.

The memory 62 may include a program memory area and a data memory area. The program memory area may store an operating system and an application program required by at least one function. The data memory area may store data that are built in accordance with application of the transmission processing device, etc. Besides, the memory 62 may include a high-speed random access memory, and may further include a non-transitory memory, such as at least one disk memory, a flash memory or other non-transitory solid-state memories. In some embodiments, the memory 62 optionally includes memories which are remotely disposed relative to the processor 60. These remote memories may be connected to the transmission processing device through networks which include but not limited to Internet, Intranet, local area network, mobile radio communications and a combination thereof.

The input device 64 may receive input digital or character information and generate key signal inputs relevant to UE settings and functional control of the transmission processing device. The output device 66 may include such display equipment as a display screen.

The one or more modules is stored in the memory 62. When the modules are executed by one or more processors 60, the transmission processing method in any above method embodiment is executed.

The electronic device may execute the method provided by the embodiment of the present disclosure and has corresponding functional modules and beneficial effects for executing the method. For technical details not described in this embodiment, refer to the method provided by the embodiment of the present disclosure.

The electronic device provided by the embodiment of the present disclosure exist in various forms, including but not limited to the followings.

(1) Mobile communication equipment: those having the feature of a mobile communication function and the main objective of providing voice and data communication, and including a smart phone (e.g., iPhone), a multimedia mobile phone, a functional mobile phone, a low-end mobile phone, etc.

(2) Ultra-mobile personal computer equipment: those belonging to personal computers, having computing and processing functions, generally having a mobile Internet access feature and including PDAs, MIDs, UMPCs, etc., for example, iPads.

(3) Portable recreation equipment: those being capable of displaying and broadcasting multimedia contents and including audio and video players (e.g., iPods), a hand-held game player, an e-book, intelligent toys and portable vehicle-mounted navigation equipment.

(4) Servers: those providing computing service and including a processor, a hard disk, an internal memory, a system bus, etc., having a similar architecture to a universal computer and placing higher demands on the processing capability, the stability, the reliability, the security, the expandability, the manageability, etc. due to the need for providing high-reliability services.

(5) Other electronic devices with data interaction functions.

The serial numbers of the embodiments of the present disclosure are merely for description, and do not represent the advantages and disadvantages of the embodiments.

In the above-mentioned embodiments of the present disclosure, the descriptions of the embodiments have their respective emphases. For the parts that are not detailed in a certain embodiment, refer to the related descriptions of other embodiments.

It should be understood that in the embodiments provided by the present disclosure, the disclosed technical contents may be realized by other means. The device embodiments described above are merely schematic. For example, the partitioning of the units may be a logical functional partitioning. There may be other partitioning modes during actual implementation. For example, multiple units or components may be combined or integrated into another system, or some features may be ignored or not executed. In addition, mutual coupling or direct coupling or communication connection that is shown or discussed may be indirect coupling or communication connection through some interfaces, units or modules, and may be in electrical or other forms.

The units described as separate components may or may not be physically separated, and the components for unit display may or may not be physical units, that is, may be located in one place or distributed on a plurality of units. Part or all of the units may be selected according to actual needs to achieve the objective of the solutions of the embodiments.

In addition, all functional units in the embodiments of the present disclosure may be integrated into one processing unit. Or, each unit exists physically independently. Or, two or more units may be integrated into one unit. The above integrated units may be realized in the form of hardware or a software functional unit.

The integrated units, if realized in the form of the software functional unit and sold or used as a standalone product, may be stored in a computer readable storage medium. Based on such understanding, the technical solution of the present disclosure in essence, or a part that contributes to the prior art, or all or part of the technical solution, may be embodied in the form of a software product. The computer software product is stored in a storage medium and includes a plurality of instructions for a computer device (which may be a personal computer, a server, a network device or the like) to perform all or part of the steps of the method described in the embodiments of the present disclosure. The foregoing storage medium includes: a USB flash disk, a Read-Only Memory (ROM), a Random Access Memory (RAM), a removable hard disk, a magnetic disk, an optical disk, or other various media that may store program codes.

The above description merely describes preferred implementations of the present disclosure, and it should be noted that those skilled in the art can also make various improvements and modifications without departing from the principle of the present disclosure. These improvements and modifications should be considered to be within the scope of protection of the present disclosure.

What is claimed is:

1. A transmission processing method, comprising:
performing uplink scheduling for a User Equipment (UE) in accordance with an uplink scheduling criterion, and determining whether to apply puncturing in accordance with an uplink scheduling result and/or determining whether to instruct the UE to apply the puncturing via signaling in accordance with the uplink scheduling performed for the UE, wherein the uplink scheduling criterion is preset and is for limiting the uplink scheduled UE to reduce a number of puncturing operations,
wherein the uplink scheduling criterion comprises in a transmitted burst, a set of uplink scheduled UEs in an (n+1)th subframe being a subset of a set of uplink scheduled UEs in an nth subframe; and
when the uplink scheduled UEs in the (n+1)th subframe being different from the uplink scheduled UEs in the nth subframe, only those UEs that will not be interfered by a reference UE being scheduled, the reference UE being an uplink scheduled UE that performs transmission in both the nth subframe and the (n+1)th subframe when the puncturing is applied in a beginning portion of the (n+1)th subframe, and the reference UE being an uplink scheduled UE that performs transmission in the nth subframe when the puncturing is applied in an ending portion of the nth subframe, where n is a positive integer number.

2. The transmission processing method according to claim 1, wherein the UEs that will not be interfered by the reference UE are determined in accordance with respective locations of the UEs or respective reports reported by the UEs.

3. The transmission processing method according to claim 2, wherein said determining the UEs that will not be interfered by the reference UE in accordance with the respective locations of the UEs comprises:
calculating a relative distance between a target UE and the reference UE; and
determining that the target UE is a UE that will not be interfered by the reference UE when the relative distance is larger than a distance threshold.

4. The transmission processing method according to claim 2, wherein said determining the UEs that will not be interfered by the reference UE in accordance with the respective reports reported by the UEs comprises:
acquiring received signal strength indicator (RSSI) information of a target UE when the reference UE performs transmission; and
determining the target UE as a UE that will not be interfered by the reference UE when a received signal strength indicated by the RSSI information is lower than a listen before talk (LBT) threshold value.

5. The transmission processing method according to claim 3, wherein the target UE is an uplink scheduled UE that is newly added in the (n+1)th subframe.

6. The transmission processing method according to claim 4, wherein the target UE is an uplink scheduled UE that is newly added in the (n+1)th subframe.

7. The transmission processing method according to claim 1, wherein said determining whether to instruct the UE to apply puncturing via signaling in accordance with the uplink scheduling performed for the UE comprises:
   comparing the uplink scheduled UEs in an (n+1)th subframe with the uplink scheduled UEs in an nth subframe to obtain the uplink scheduling result, and instructing whether to apply puncturing in accordance with the uplink scheduling result.

8. The transmission processing method according to claim 1, wherein said determining whether to instruct the UE to apply puncturing via signaling in accordance with the uplink scheduling performed for the UE comprises:
   comparing the uplink scheduled UEs in an (n+1)th subframe with the uplink scheduled UEs in an nth subframe to obtain the uplink scheduling result;
   if the uplink scheduling result meets the uplink scheduling criterion, determining to instruct a reference UE not to apply puncturing via signaling, wherein the reference UE being an uplink scheduled UE that performs transmission in both the nth subframe and the (n+1)th subframe when the puncturing is applied in a beginning portion of the (n+1)th subframe, and the reference UE being an uplink scheduled UE that performs transmission in the nth subframe when the puncturing is applied in an ending portion of the nth subframe; and
   if the uplink scheduling result does not meet the uplink scheduling criterion, determining to instruct the reference UE to apply puncturing via signaling.

9. The transmission processing method according to claim 8, wherein the uplink scheduling criterion comprises a first uplink scheduling criterion and a second uplink scheduling criterion,
   if the uplink scheduling result meets the uplink scheduling criterion, said determining to instruct the reference UE not to apply puncturing via signaling comprises: if the uplink scheduling result meets the first uplink scheduling criterion or the second uplink scheduling criterion, determining to instruct the reference UE not to apply puncturing via signaling, wherein the first uplink scheduling criterion being that in a transmitted burst, a set of uplink scheduled UEs in the (n+1)th subframe is a subset of a set of uplink scheduled UEs in the nth subframe, and the second uplink scheduling criterion being that when the uplink scheduled UEs in the (n+1)th subframe are different from the uplink scheduled UEs in the nth subframe, only those UEs that will not be interfered by the reference UE is scheduled; and
   if the uplink scheduling result does not meet the uplink scheduling criterion, said determining to instruct the reference UE to apply puncturing via signaling comprises: if the uplink scheduling result meets none of the first uplink scheduling criterion and the second uplink scheduling criterion, determining to instruct the reference UE to apply puncturing via signaling.

10. The transmission processing method according to claim 8, wherein instructing the reference UE to apply puncturing via signaling is based on CPDCCH or uplink control indicator.

11. A transmission processing device, comprising: a processing unit configured to perform uplink scheduling for a User Equipment (UE) in accordance with an uplink scheduling criterion and to determine whether to apply puncturing in accordance with an uplink scheduling result and/or to determine to whether to instruct the UE to apply the puncturing via signaling in accordance with the uplink scheduling performed for the UE, wherein the uplink scheduling criterion is preset and is for limiting the uplink scheduled UEs to reduce a number of puncturing operations,
   wherein the uplink scheduling criterion comprises in a transmitted burst, a set of uplink scheduled UEs in an (n+1)th subframe being a subset of a set of uplink scheduled UEs in an nth subframe; and when the uplink scheduled UEs in the (n+1)th subframe being different from the uplink scheduled UEs in the nth subframe, only those UEs that will not be interfered by a reference UE being scheduled, the reference UE being an uplink scheduled UE that performs transmission in both the nth subframe and the (n+1)th subframe when the puncturing is applied in a beginning portion of the (n+1)th subframe, and the reference UE being an uplink scheduled UE that performs transmission in the nth subframe when the puncturing is applied in an ending portion of the nth subframe, where n is a positive integer number.

12. A non-transient computer readable storage medium, wherein the non-transient computer readable storage medium stores computer instructions configured to cause a computer to; perform uplink scheduling for a User Equipment (UE) in accordance with an uplink scheduling criterion and to determine whether to apply puncturing in accordance with an uplink scheduling result and/or to determine to whether to instruct the UE to apply the puncturing via signaling in accordance with the uplink scheduling performed for the UE, wherein the uplink scheduling criterion is preset and is for limiting the uplink scheduled UEs to reduce a number of puncturing operations,
   wherein the uplink scheduling criterion comprises in a transmitted burst, a set of uplink scheduled UEs in an (n+1)th subframe being a subset of a set of uplink scheduled UEs in an nth subframe; and when the uplink scheduled UEs in the (n+1)th subframe being different from the uplink scheduled UEs in the nth subframe, only those UEs that will not be interfered by a reference UE being scheduled, the reference UE being an uplink scheduled UE that performs transmission in both the nth subframe and the (n+1)th subframe when the puncturing is applied in a beginning portion of the (n+1)th subframe, and the reference UE being an uplink scheduled UE that performs transmission in the nth subframe when the puncturing is applied in an ending portion of the nth subframe, where n is a positive integer number.

13. A computer program product, comprising a computer program that is stored on a non-transitory computer readable storage medium, wherein the computer program comprises program instructions which, when executed by a computer, cause the computer to; perform uplink scheduling for a User Equipment (UE) in accordance with an uplink scheduling criterion and to determine whether to apply puncturing in accordance with an uplink scheduling result and/or to determine to whether to instruct the UE to apply the puncturing via signaling in accordance with the uplink scheduling performed for the UE, wherein the uplink scheduling criterion is preset and is for limiting the uplink scheduled UEs to reduce a number of puncturing operations,
   wherein the uplink scheduling criterion comprises in a transmitted burst, a set of uplink scheduled UEs in an (n+1)th subframe being a subset of a set of uplink scheduled UEs in an nth subframe; and when the uplink scheduled UEs in the (n+1)th subframe being different from the uplink scheduled UEs in the nth subframe, only those UEs that will not be interfered by a reference UE being scheduled, the reference UE being an uplink scheduled UE that performs transmission in both the nth subframe and the (n+1)th subframe when the puncturing is applied in a beginning portion of the (n+1)th subframe, and the reference UE being an uplink scheduled UE that performs transmission in the nth subframe when the puncturing is applied in an ending portion of the nth subframe, where n is a positive integer number.

14. An electronic device, comprising at least one processor and a memory communicatively connected with the at least one processor, wherein the memory stores instructions executable by the at least one processor, and configured to; perform uplink scheduling for a User Equipment (UE) in accordance with an uplink scheduling criterion and to determine whether to apply puncturing in accordance with an uplink scheduling result and/or to determine to whether to instruct the UE to apply the puncturing via signaling in accordance with the uplink scheduling performed for the UE, wherein the uplink scheduling criterion is preset and is for limiting the uplink scheduled UEs to reduce a number of puncturing operations, wherein the uplink scheduling criterion comprises in a transmitted burst, a set of uplink scheduled UEs in an (n+1)th subframe being a subset of a set of uplink scheduled UEs in an nth subframe; and when the uplink scheduled UEs in the (n+1)th subframe being different from the uplink scheduled UEs in the nth subframe, only those UEs that will not be interfered by a reference UE being scheduled, the reference UE being an uplink scheduled UE that performs transmission in both the nth subframe and the (n+1)th subframe when the puncturing is applied in a beginning portion of the (n+1)th subframe, and the reference UE being an uplink scheduled UE that performs transmission in the nth subframe when the puncturing is applied in an ending portion of the nth subframe, where n is a positive integer number.

\* \* \* \* \*